G. C. DE BAY.
METHOD OF MAKING POLISHED GLASS.
APPLICATION FILED MAY 26, 1909.
972,165.
Patented Oct. 11, 1910.
4 SHEETS—SHEET 1.
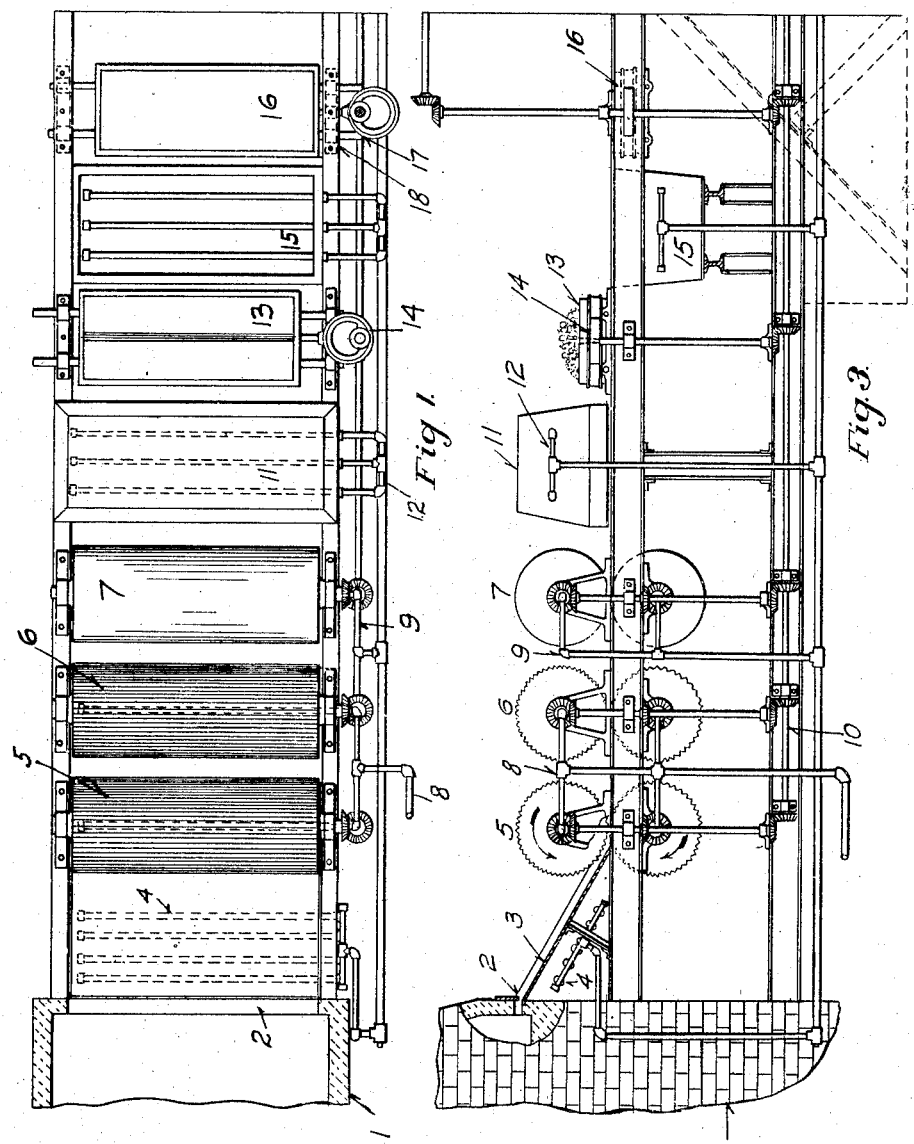
WITNESSES
INVENTOR
George C. De Bay,
By Fred'k W. Winter
Attorney G. C. DE BAY.
METHOD OF MAKING POLISHED GLASS.
APPLICATION FILED MAY 26, 1909.
972,165.
Patented Oct. 11, 1910.
4 SHEETS—SHEET 2.
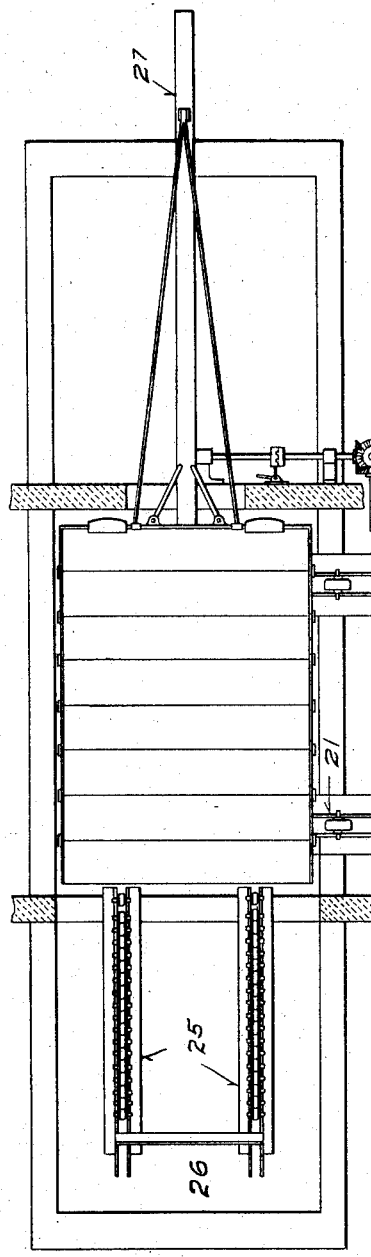
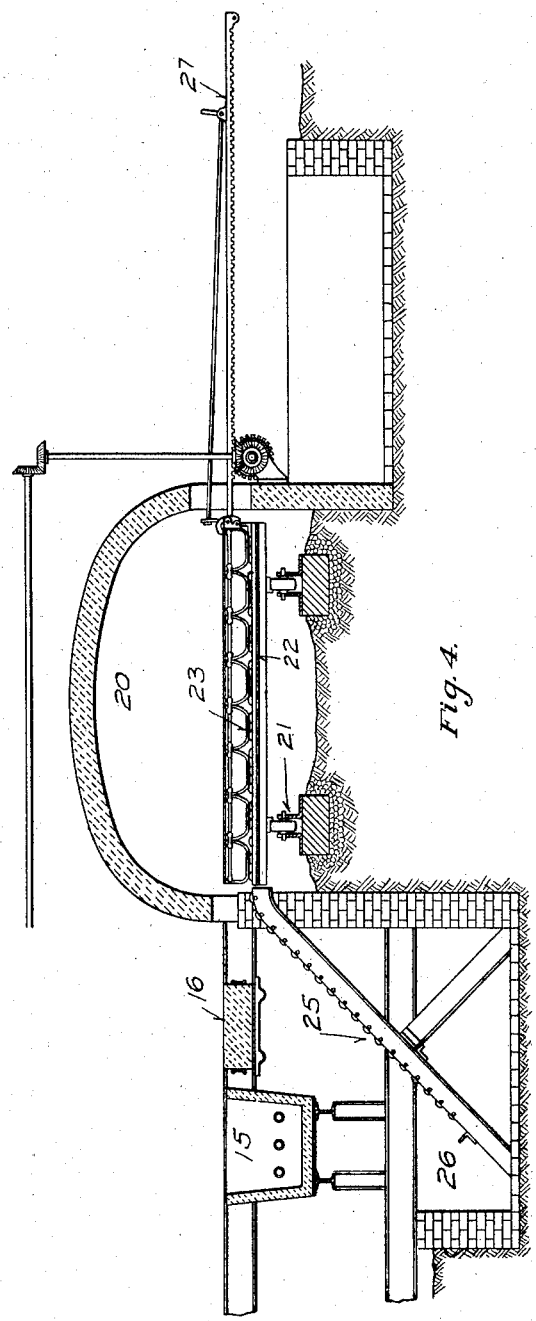
WITNESSES
INVENTOR
George C. DeBay.
By Fred'k W. Winter
Attorney

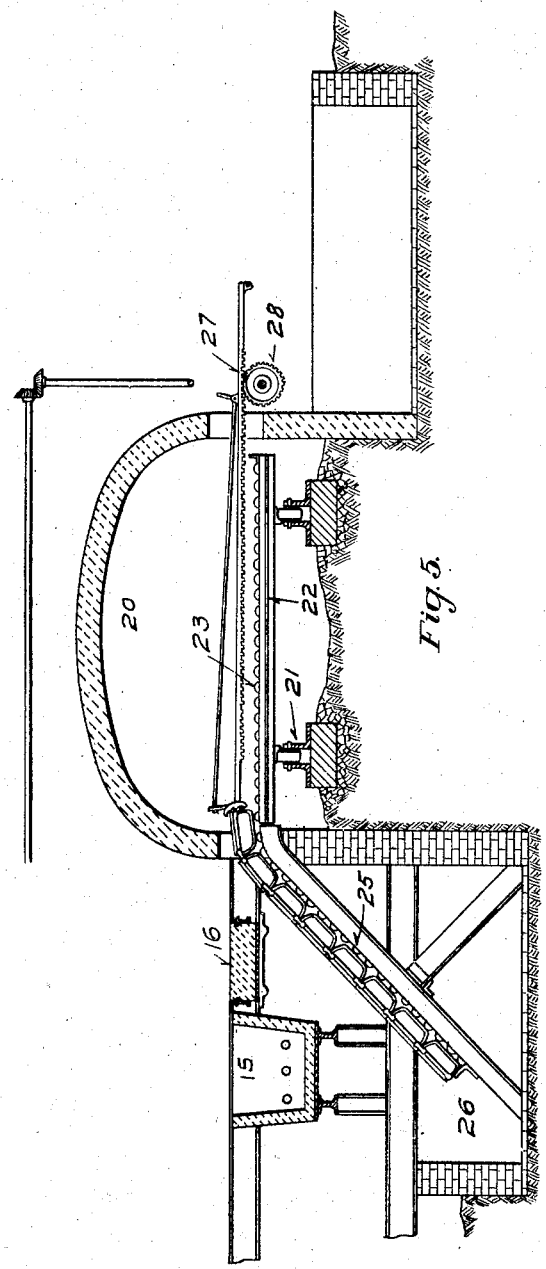
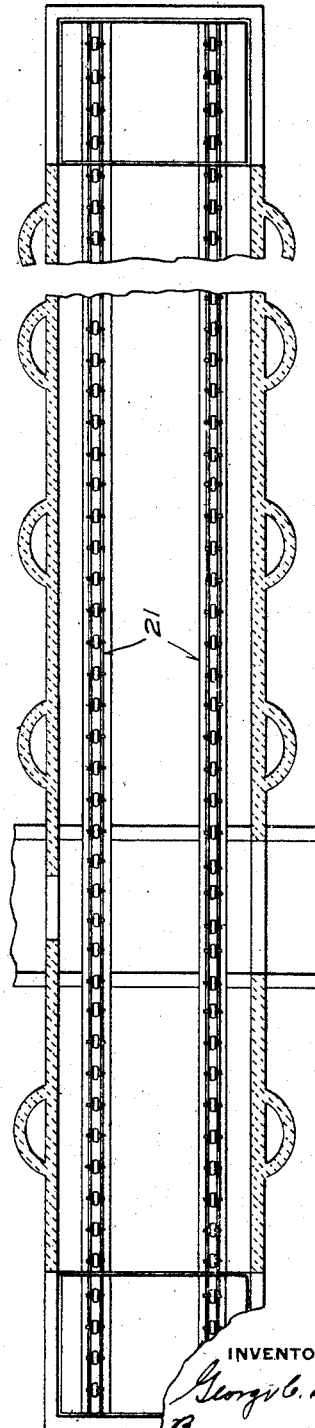

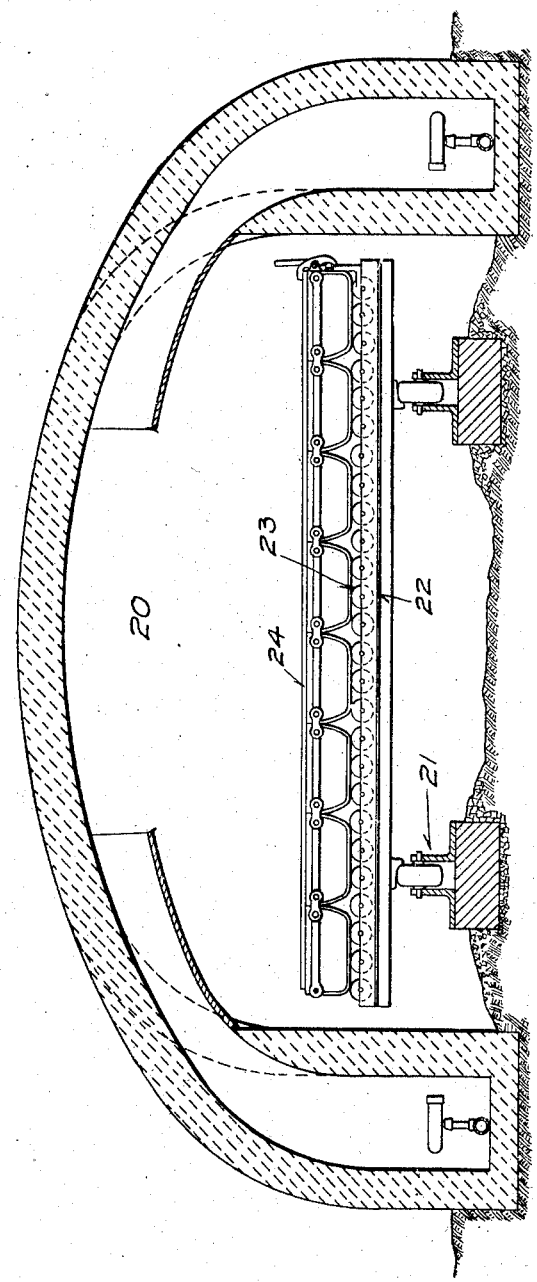

UNITED STATES PATENT OFFICE.

GEORGE C. DE BAY, OF TARENTUM, PENNSYLVANIA, ASSIGNOR OF ONE-HALF TO JOSEPH HEIDENKAMP, OF SPRINGDALE, PENNSYLVANIA.

METHOD OF MAKING POLISHED GLASS.

972,165.  Specification of Letters Patent.  Patented Oct. 11, 1910.

Application filed May 26, 1909. Serial No. 498,553.

*To all whom it may concern:*

Be it known that I, GEORGE C. DE BAY, a resident of Tarentum, in the county of Allegheny and State of Pennsylvania, have invented a new and useful Improvement in Methods of Making Polished Glass, (Case 1,) of which the following is a specification.

This invention relates to a method of forming polished glass in the form of sheets or plates and whereby glass having all of the qualities and characteristics of ground and polished plate glass can be produced very quickly and cheaply.

The essential features of the invention consist in fire polishing the surfaces of the glass under such conditions and in such manner as to make the same perfectly smooth and without waves or irregularities, the high glaze of the fire finish giving the necessary polish and producing glass in all essential particulars the same as polished plate glass.

The present method of manufacturing polished, or what is known as plate glass, consists in forming the plate, preferably by rolling, and afterward subjecting the same to a grinding and polishing operation to give the desired smooth flat surface. The grinding and polishing is accomplished when the plate is cold and is a slow and rather expensive process and is the principal factor in the high cost of polishing plate glass at present on the market.

It is well known that glass can be given a polished or highly glazed surface by fire finishing the same, that is, by subjecting the same to sufficient heat to practically melt the surface of the glass, and various small articles of glass ware have heretofore been finished in that way. This method has, however, as far as I am aware, not heretofore been adapted for finishing large sheets or plates of glass on both surfaces. This, I believe, is due to the fact that the necessary heat for fire finishing is liable to leave a wavy or irregular effect on the surface of the glass, and also to the difficulty of supporting the plate so as not to destroy the glaze or polish on the lower surface thereof.

My method has for its purpose to produce sheet or plate glass having all the qualities of cold polished plate glass and by fire finishing both surfaces thereof.

The invention comprises the process steps hereinafter described and claimed.

In the accompanying drawings Figures 1 and 2 represent in plan view, partly in horizontal section, apparatus suitable for carrying out my method; Fig. 3 is an elevation showing the plate forming mechanism in side view; Fig. 4 shows part of the plate forming mechanism of Fig. 3 and the receiving mechanism in vertical section; Fig. 5 is a view similar to Fig. 4 showing the parts in a different position; Fig. 6 is a horizontal section through the leer, and Fig. 7 is a cross section of the leer taken through the heating chambers.

The apparatus shown includes a suitable furnace 1 for melting the glass, which may be either a tank or pot furnace or the like. The furnace shown is provided with a tank having a gate controlled slot 2 through which the molten glass escapes in the form of a thin wide stream forming practically a sheet or plate. This passes down over the chute or guide 3 which is supplied underneath with burners 4 for heating the same in order to maintain the glass in molten condition. The thin wide stream of glass passes in succession between three pairs of rolls 5, 6 and 7 which act to form the sheet to uniform thickness, compact the same, and feed the same forward. The first pair of rolls 5 are slightly fluted or corrugated so as to impart a forward feed to the plate. The second pair of rolls 6 are also slightly corrugated for the same purpose while the third pair of rolls 7 are smooth so as to press out the corrugations imparted to the sheet by the first two pair of rolls. The first pair of rolls 5, and preferably also the second pair 6, are water cooled internally, such as by pipes 8, so as to cool the plate and give the same sufficient rigidity for the subsequent operations. The last pair of rolls is preferably heated, such as by the internal gas pipe 9, in order to keep up the temperature of the surface of the glass sheet. These rolls are mounted in a suitable table and can be driven by any suitable mechanism, the drawings showing for this purpose shafts and bevel gears driven from the longitudinal shaft 10. These rolls are only one form of sheet forming mechanism which may be employed.

The sheet or plate is subjected on its upper surface to the fire finishing process preferably immediately after leaving the forming rolls, at which time the sheet or plate is still at a high temperature so that it is not likely to break and does not require a large amount of heat to fire finish the same. My invention, however, is not limited in this particular, as the fire finishing could be accomplished on an already cold sheet or plate, in which case, however, the sheet would first have to be heated up slowly to prevent breaking and a larger amount of heat would be necessary for fire finishing. The plate, however, must be fairly rigid by the time it is subjected to the fire finishing on its lower surface so as to practically support itself.

In the apparatus shown the top surface is first fire finished, after which the bottom surface is similarly finished. Adjacent to the last pair of rolls 7 is a suitable heater or furnace 11 located above the course of the sheet or plate and serving to fire finish the top surface thereof. This furnace is provided with gas burners 12 and is lined with fire brick or the like and is maintained throughout at a very high heat, approximately at what may be called a glory hole heat. The flame is not intended to strike the surface of the glass, but the latter is melted by the heat within the furnace. The heat finishing of the surfaces of the sheet may be accomplished by other devices than those shown. The temperature must be such as to quickly melt a thin skin on the surface of the plate so as to give the usual fire finish or polish thereto. This, however, is likely to leave slight waves or undulations or other irregularities in the surface of the glass which would render it unfit as a substitute for polished plate glass without subsequent cold grinding or polishing which I wish to avoid. To smooth out such waves, undulations or irregularities, the surface of the glass while still practically melted or plastic is subjected to a very light rubbing action by means of a block 13 reciprocated by means of eccentric 14. This block exerts only a very light pressure on the surface of the glass and is formed of any substance which will not adhere to the glass and will become heated so as not to chill the glass and which is perfectly smooth so as to have no scratching or abrading effect on the glass. Various substances for this purpose may be used. A smooth steel surface will answer the purpose, but with very high heats there might be a tendency of the glass to adhere thereto. A block of oak wood will answer. I prefer a mixture of fine smooth carbon, such as charflake, with a suitable binder therefor, such as plaster of paris, and such as described and claimed in application of even date herewith, Serial No. 498,555. Loose fine charcoal or other fine carbon may be fed between the rubbing blocks and the glass, being rubbed, if desired, as shown in Fig. 3. For this purpose the block is provided with a slot therethrough as shown. The rubbing action of this device smooths out the waves, undulations or other irregularities, and gives a perfectly flat surface to the glass, free from all scratches or scores and without in any manner affecting the high polish or glaze given by the fire finish, so that when the surface cools a perfectly smooth polished effect is left. The lower surface of the sheet is similarly finished by means of a furnace 15 and a smoothing block 16 located underneath the course of the glass sheet. The sheet by this time is sufficiently rigid so that it supports itself over this device, which is necessary for the reason that nothing but the smoothing device 16 must contact with the lower surface of the plate from the time that it is subjected to the action of the furnace 15 until it is cooled, as otherwise the glaze produced by the fire finishing would be destroyed. The smoothing block 16 in this case must be held up against the surface of the glass, such as by means of guide rods 17 moving in guides 18.

The devices described give to both surfaces of the plate a perfectly smooth polished finish, and nothing further is necessary to complete the glass except to so handle it during annealing that this glazed smooth finish is not disturbed or marred. According to my invention the plates are then transferred to suitable carriages or wagons for carrying the same through the annealing oven or leer and the transfer to the carriages is made in such way that there is no sliding movement between the plate and carriage or other supporting device. The leer is shown at 20 extending at right angles to the course of the plate, and is provided with tracks 21 upon which run the carriages 22. These carriages are of double construction having the bottom member running upon the tracks 21, said bottom member on its top surface being provided with ways or tracks 23 at right angles to the tracks 21, upon which ways or tracks is mounted the top or plate supporting portion 24 of the carriage. The top or plate supporting platform 24 is formed in sections, as shown, suitably hinged together so that when said platform is moved off the bottom member of the carriage these sections flex and extend downwardly on tracks 25 into a pit 26. When the edge of the plate reaches the carriage the platform 24 is pulled onto the bottom part of the carriage and at exactly the same speed as the traveling plate, so that the plate is progressively fed onto these hinged sections and without liability of any relative sliding movement between the plate and said sections. This prevents scratching and otherwise marring the lower surface of the plate. The mechanism for pulling the hinged sections 24 onto the carriage will be driven from the same source and at exactly the same peripheral speed as the plate forming mechanism, so as to insure non-slipping between the plate and its support. This is shown as accomplished by the rack bar 27 actuated by gear 28 which is driven by suitable shafting and gears from the shaft 10 of the plate forming mechanism.

The hinged sections of the platforms 24 are preferably formed of the composition above described for forming the smoothing blocks, as it is found that this substance has no affinity for hot glass and is peculiarly well adapted to prevent dulling or clouding the lower polished surface of the glass plate in the annealing oven. The plate while supported upon the carriages described is moved slowly through the annealing oven or leer 20 until properly annealed and emerges from the said annealing oven a plate of perfectly uniform thickness having both surfaces absolutely smooth and with a high glaze or polish thereon.

By the process described grinding and polishing is entirely omitted and this slow and expensive step in the manufacture of plate glass avoided. The plates are of equal quality with those produced by the present expensive methods, or if anything have a higher polish or gloss. The manner of producing the same is very rapid so that the cost is very much lower than according to present methods of making polished plate glass. Plates of any desired size can be manufactured according to this method. The plate forming apparatus will, of course, be as wide as the greatest width of plate to be formed and plates of any desired length can be formed by cutting off the flow of the stream of molten glass from the tank at the proper periods. The annealing oven must be of a width corresponding to the length of the longest plate to be annealed therein, since the plates are carried through the annealing oven with their lengths crosswise of the annealing oven.

What I claim is:

1. The method of making polished glass consisting in forming a sheet or plate of uniform thickness by pressure between unyielding surfaces, and when rigid fire polishing one surface thereof, and while still plastic subjecting the same to a light rubbing action to smooth the same, and then similarly fire polishing and smoothing the other surface of said plate.

2. The method of making polished glass consisting in forming a sheet or plate of uniform thickness by pressure between unyielding surfaces, and when rigid but still hot fire finishing a surface thereof, and while still plastic subjecting said surface to the light rubbing action of a body of smooth substance non-adhesive to hot glass.

3. The method of making polished plate glass consisting in rolling molten glass to form a sheet or plate of uniform thickness, and when rigid fire polishing both surfaces thereof, and while said surfaces are still plastic subjecting the same to a light rubbing action to smooth the same.

4. The method of making polished plate glass consisting in pouring a thin flat stream of glass of substantially the width of the desired sheet and forming it into a sheet, rolling the same to uniform thickness, then when rigid but still hot fire polishing both surfaces thereof, and finally annealing said sheet or plate.

5. The method of making polished plate glass consisting in forming a sheet or plate of uniform thickness by pressure between unyielding surfaces, then fire polishing the lower face thereof, then delivering the plate endwise onto a carrier having a flat supporting surface in a manner to prevent relative movement between plate and carrier, and while on said carrier annealing said plate.

6. The method of making polished plate glass consisting in forming a sheet or plate of uniform thickness by pressure between unyielding surfaces, fire polishing the lower face thereof, then delivering the plate endwise onto the flat surface of a traveling non-abradent support and at the same rate of travel as the travel of said support, and cooling said plate while on said support.

7. The method of making polished plate glass consisting in forming a sheet or plate of uniform thickness, then when the plate is rigid but still hot and while in a horizontal position fire finishing both faces thereof, and annealing the same while supported throughout its entire area by a substance non-adhesive to hot glass.

8. The method of making polished plate glass consisting in forming a sheet or plate of uniform thickness by pressure between unyielding surfaces, then when the plate is rigid and while in a horizontal position fire polishing both surfaces thereof, and finally annealing said plate while supported on the flat surface of a body of smooth non-abrading carbonaceous material.

9. The method of making polished glass consisting in rolling molten glass to form a sheet or plate, then when rigid but still hot and while in a horizontal position fire finishing both surfaces thereof, then delivering said plate to a carrier having a flat supporting face consisting of a substance non-adhesive to glass and in a manner to prevent relative movement between said plate and carrier, and while supported on said carrier annealing said plate.

In testimony whereof, I have hereunto set my hand.

GEORGE C. DE BAY.

Witnesses:
F. W. WINTER,
JOHN S. CORT.